United States Patent
Cox

(10) Patent No.: US 11,975,823 B2
(45) Date of Patent: May 7, 2024

(54) METHOD FOR MANEUVERING AN ELECTRIC TAXI DRIVE SYSTEM DRIVEN AIRCRAFT INTO AN AIRPORT RAMP PARKING LOCATION

(71) Applicant: Borealis Technical Limited, North Plains, OR (US)

(72) Inventor: Nechama Cox, Baltimore, MD (US)

(73) Assignee: Borealis Technical Limited (IM)

( * ) Notice: Subject to any disclaimer, the term of this patent is extended or adjusted under 35 U.S.C. 154(b) by 309 days.

(21) Appl. No.: 17/485,133

(22) Filed: Sep. 24, 2021

(65) Prior Publication Data

US 2022/0097831 A1 Mar. 31, 2022

Related U.S. Application Data

(60) Provisional application No. 63/083,636, filed on Sep. 25, 2020.

(51) Int. Cl.
*G08G 5/06* (2006.01)
*B64C 25/32* (2006.01)
*G05D 1/00* (2006.01)

(52) U.S. Cl.
CPC ......... *B64C 25/405* (2013.01); *G05D 1/0083* (2013.01); *G08G 5/065* (2013.01)

(58) Field of Classification Search
CPC ..... B64C 25/405; G05D 1/0083; G08G 5/065
See application file for complete search history.

(56) References Cited

U.S. PATENT DOCUMENTS

| | | | |
|---|---|---|---|
| 10,308,352 B2 * | 6/2019 | Cookman | B64C 25/405 |
| 10,964,221 B2 * | 3/2021 | Vana | G01S 17/89 |
| 2014/0336847 A1 * | 11/2014 | Cox | B64C 25/405 |
| | | | 701/3 |
| 2020/0013301 A1 * | 1/2020 | Vana | B64C 25/405 |

FOREIGN PATENT DOCUMENTS

| | | | | |
|---|---|---|---|---|
| EP | 3584172 A1 | 12/2019 | | |
| FR | 3028085 A1 * | 5/2016 | ........... | G05D 1/0083 |

* cited by examiner

*Primary Examiner* — Tye William Abell

(57) ABSTRACT

The present invention provides a method for maneuvering and aligning aircraft equipped and driven during ramp ground travel with landing gear wheel-mounted electric taxi drive systems that have deviated from taxi line travel paths and for maneuvering the electric taxi drive system-driven aircraft to park accurately to align with locations of parking stops when the aircraft nose landing gear wheels stop beyond or short of a parking stop. The aircraft pilot can, without waiting for a tug or starting aircraft engines, precisely maneuver the aircraft with the electric taxi drive systems while viewing the taxi line and parking stop location in real time with an optional camera and sensor system while maneuvering the aircraft in forward or reverse and lateral directions to align the aircraft nose wheels with the taxi line path and to accurately position the nose landing gear wheels at the parking stop.

11 Claims, 3 Drawing Sheets

METHOD FOR MANEUVERING AN ELECTRIC TAXI DRIVE SYSTEM DRIVEN AIRCRAFT INTO AN AIRPORT RAMP PARKING LOCATION

TECHNICAL FIELD

The present invention relates generally to maneuvering aircraft into parking locations at airports and specifically to maneuvering and aligning aircraft into an airport ramp parking location with landing gear wheel-mounted electric taxi drive systems.

BACKGROUND OF THE INVENTION

Aircraft parking locations in most airport apron or ramp areas are typically designated by stop locations or stops at each parking location that correspond to a specific location where aircraft nose landing gear wheels should stop and not proceed further. Depending on the size or configuration of the airport, a stop may be positioned at a designated airport terminal gate or stand location where passenger loading bridges or stairs are to be connected to the aircraft so that disembarking passengers may leave the aircraft. At many airports, stops may be painted or otherwise indicated, for example by reflective strips, on the ground surface. At other airports, the stop location may be indicated by a visual guidance docking system that communicates the stop location to the pilot or cockpit crew. A lead-in line or taxi line within the ramp area that ends at the stop location is required at most airports to guide the aircraft pilot to direct the aircraft along an optimal path to the stop location. Multiple lead-in or taxi lines may be provided to guide aircraft entering the ramp area from different directions. These lines may be painted or otherwise indicated on the ramp ground surface. Depending on the national or international location of the airport, lead-in lines or taxi lines must be painted a specific color, typically yellow.

Many, if not most, airport ramp areas tend to be congested places for at least portions of an operational day with multiple aircraft arriving and departing and ground service equipment and ground personnel servicing these aircraft. Some particularly busy airports seem always to be congested. At the present time, almost all aircraft are moved into ramp areas and along taxi lines to stops at terminal parking locations, primarily with at least one aircraft engine operating at idle thrust. At some airports and in specific situations, aircraft may be towed to the stop location by a tow vehicle or tug. When an aircraft driven on the ground with an operating engine pulls into a gate parking location and the nose landing gear wheels travel beyond the stop location so that the aircraft overshoots the stop, it is currently necessary to attach the aircraft to a tug and push the aircraft back so that the nose landing gear wheels are positioned at the stop location. Aircraft engines are prohibited from using reverse thrust to move aircraft in a reverse direction in ramps or aprons in almost all airports because of the jet blast and hazards associated with operating engines to move aircraft using reverse thrust. If an aircraft stops short of the stop location and shuts off its engines or if an aircraft veers off the taxi line path, a tug may also be needed to pull the aircraft forward to the stop or return the aircraft to the taxi line path. Re-starting an aircraft engine to move an aircraft forward to a stop location may also be accompanied by the hazards that accompany engine operation.

In the situations where aircraft are towed forward into terminal parking locations by tugs and overshoot the stops, the tug must be detached from the aircraft and connected to the aircraft in a pushback orientation to be able to move the aircraft in reverse. Tugs to push back and reposition an aircraft at the correct stop location or align an aircraft with the taxi line orientation may not be available when needed for these tasks. Consequently, the aircraft must wait until a tug and the correct tow bar are available, delaying the deboarding of arriving passengers from the aircraft and potentially delaying the boarding of departing passengers and the aircraft's departure. Additionally, diverting tugs that may be needed for pushback of departing aircraft to the repositioning of arriving aircraft that have overshot or undershot stop locations or that have deviated from taxi line paths, may cause additional delays.

Moving aircraft on the ground during pushback and at other times without reliance on external tow vehicles and operating aircraft engines has been proposed. Applicant and others have proposed electric and other taxi drive systems mounted in aircraft landing gear wheels that may move aircraft during ground travel and during airport ground operations. Using the electric taxi or other drive systems to maneuver and reposition aircraft that have undershot and overshot stop locations while parking at terminal parking locations or to align aircraft that have deviated from taxi line paths has not been suggested, however.

There is a need, therefore, for a method that easily, precisely, and safely enables the maneuvering and repositioning of aircraft that have undershot and overshot stop locations or have deviated from lead-in or taxi line paths that does not employ the present practice of relying on tugs or require that aircraft engines be re-started to maneuver the aircraft to a parking stop location or to align aircraft with a lead-in or taxi line path.

SUMMARY OF THE INVENTION

It is a primary object of the present invention, therefore, to provide a method that easily and safely maneuvers and repositions aircraft that have undershot or overshot stop locations or have deviated from lead-in or taxi line paths without relying on tugs or re-starting engines to align these aircraft with a stop location or with a lead-in or taxi line path.

It is another object of the present invention to provide a method that maneuvers electric taxi drive system-equipped aircraft with the electric taxi drive systems to reposition and align the aircraft with taxi lines and stops while the aircraft is driven to park in a terminal parking location.

It is an additional object of the present invention to provide aircraft equipped with landing gear wheel-mounted electric taxi drive systems operable to precisely and safely maneuver the equipped aircraft from a stopped position unaligned with a parking stop location to a position where the nose landing gear wheels are accurately aligned with the parking stop location.

It is yet another object of the present invention to provide an alignment method for aircraft equipped with landing gear wheel-mounted electric taxi drive systems operable to precisely and safely maneuver the equipped aircraft from a stopped location short of a parking stop in a forward direction to align the equipped aircraft's nose landing gear wheels with the parking stop.

It is yet another object of the present invention to provide an alignment method for aircraft equipped with landing gear wheel-mounted electric taxi drive systems operable to precisely and safely maneuver the equipped aircraft from a stopped location beyond a parking stop in a reverse direction to align the equipped aircraft's nose landing gear wheels with the parking stop.

It is a further object of the present invention to provide a method for maneuvering aircraft equipped with landing gear wheel-mounted electric taxi drive systems that precisely and safely maneuvers the equipped aircraft with only the electric taxi drive systems in forward and reverse directions to align the aircraft with a taxi line path when the aircraft's ground travel path is detected to have deviated from or veered off the taxi line path.

It is yet a further object of the present invention to provide a method for maneuvering aircraft equipped with landing gear wheel-mounted electric taxi drive systems that precisely and safely maneuvers the equipped aircraft with only the electric taxi drive systems in forward and reverse directions to align an aircraft that has deviated from or veered off the taxi line path with a passenger loading bridge.

It is yet another object of the present invention to provide a method that maneuvers aircraft equipped with landing gear wheel-mounted electric taxi drive systems and an aircraft-mounted camera and sensor system cooperatively operable to enable repositioning and alignment of the equipped aircraft with taxi lines and stops during ramp ground travel of the equipped aircraft to an airport parking location.

In accordance with the foregoing objects, the present invention provides a method that may be used by aircraft equipped with landing gear wheel-mounted electric taxi systems and, optionally, with aircraft-mounted camera and sensor systems to precisely and safely maneuver the aircraft into alignment with taxi lines and stop locations as the aircraft are driven with the drive systems through an airport ramp area to park at an airport ramp parking location. The equipped aircraft are driven with the electric taxi drive systems into the airport ramp area and along a taxi line or lead-in line to a stop location at an assigned gate or stand parking location. In the event that the equipped aircraft has overshot or undershot the stop location and the nose landing gear wheels have passed or not reached the stop location, the pilot of the equipped aircraft may precisely maneuver the aircraft in a reverse or a forward direction with the electric taxi drive systems and safely reposition the aircraft so that the nose landing gear wheels are properly located and aligned with the stop location, without waiting for a tug or re-starting the aircraft engines. When a camera and sensor system is provided, information from cameras and sensors transmitted to the aircraft cockpit may be used by the pilot to maneuver the equipped aircraft with the electric taxi drive systems and precisely reposition the nose landing gear wheels at the stop location. Passenger loading bridges or stairs may be immediately connected to the equipped aircraft as soon as the nose landing gear wheels reach the stop location and the aircraft has stopped moving. Aircraft travel path deviation from alignment with taxi lines may be precisely and safely corrected by maneuvering the aircraft with the electric taxi drive systems.

Additional objects and advantages will be apparent from the following description, claims, and drawings.

DESCRIPTION OF THE INVENTION

Figure 1:
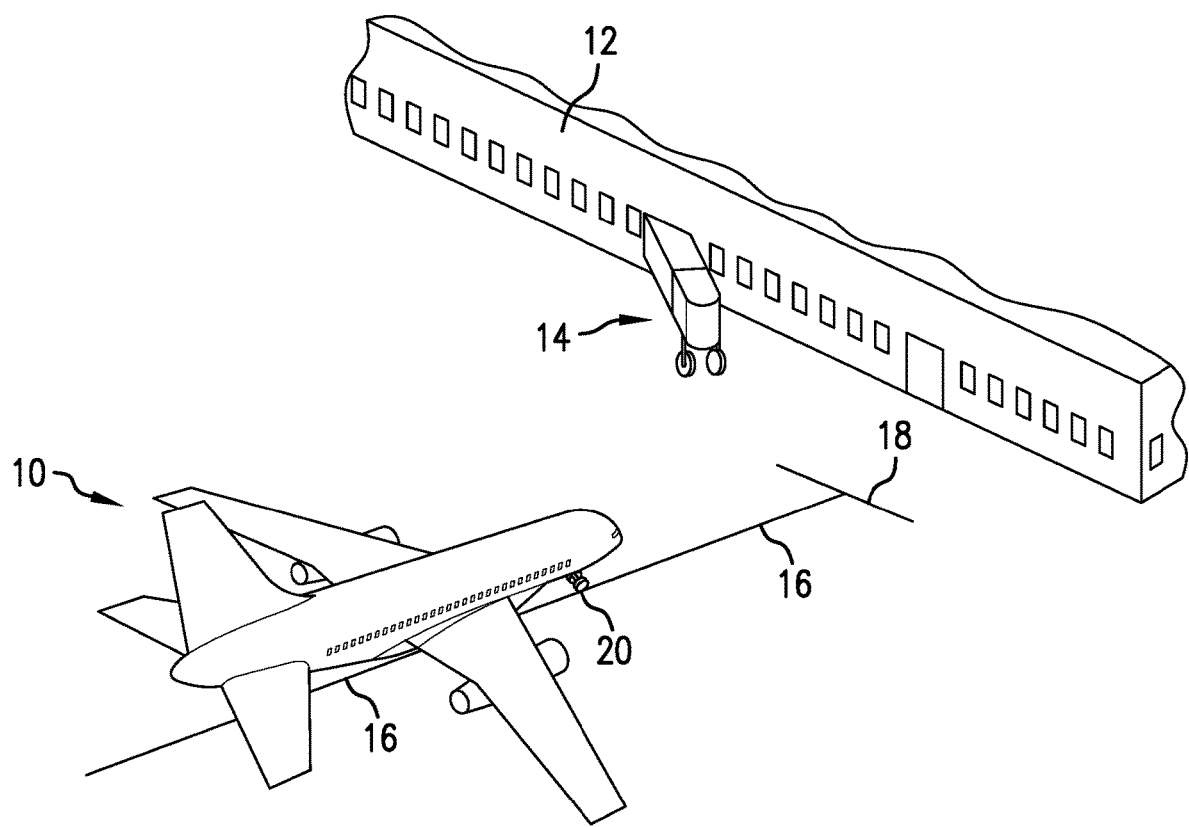
FIG. 1 is a diagrammatic plan view of an airport ramp area parking location at an airport terminal with an equipped aircraft traveling along a taxi line and approaching the parking location stop.

As noted above, there are instances when an aircraft traveling into a parking location at an airport terminal gate or stand moves beyond the parking stop location and undershoots or overshoots the stop location so that the nose landing gear wheels of the aircraft are positioned short of or beyond, instead of aligned with the stop location. There may also be instances during ramp ground travel when an aircraft's actual ground travel path deviates to the right or left of the path marked by a designated taxi line or lead-in line for the aircraft's assigned parking location. When this happens, it may be more difficult to align and connect a passenger loading bridge to the aircraft, in-ground services may not be able to connect to corresponding connections on the lower aircraft fuselage, and there may not be sufficient safe space between the aircraft and the terminal for ground service equipment to move. The incorrect position of the aircraft within the ramp area, whether due to the deviation of its ramp travel path from the taxi-in line or the location of the nose landing gear wheels short of or beyond the parking location stop, may also impact the movement of other aircraft. As noted above, the current process for moving an aircraft that is not aligned with a parking stop is to attach a tug to the aircraft and push it back or tow it forward the distance required to align the nose landing gear wheels with the stop location. This process may also be used to align aircraft that have deviated from a taxi line during ground travel into a parking location. The disadvantages of maneuvering aircraft with a tug in these situations are described above. The present invention provides a method for easily and safely maneuvering aircraft equipped with landing gear wheel-mounted electric taxi drive systems and, optionally, with a camera and sensor system, in reverse and in forward directions to position the nose landing gear wheels in alignment with the stop location and park at a gate or stand. The present invention also provides a method for correcting deviations of the aircraft's ground travel path at any point along the taxi line path by maneuvering the aircraft with the landing gear wheel-mounted electric taxi systems and realigning the aircraft's nose landing wheels with the taxi line.

The terms "airport terminal" and "terminal" include an airport terminal building and like structures, whether or not attached to a terminal building. The terms "parking location," "gate," and "stand" all are used to refer to places where aircraft are parked at or near an airport terminal. The terms "ramp" and "ramp area" will be used herein to refer to the area at an airport that is intended to accommodate aircraft for the loading and unloading of passengers, mail, cargo, fueling, parking, or maintenance. The term "ramp" is synonymous with the term "apron," which is also used to identify this airside area at an airport. The terms "taxi line" and "lead-in line" both refer to a guide path to be followed by the aircraft within the ramp area to a designated parking location. As discussed herein, these lines are typically painted on the ground to mark them. A "stop location" or "stop" refers to a specific position or coordinate where the aircraft's nose landing gear wheels are expected to stop and may or may not be marked on the ground. Different aircraft types have may have different stop positions and locations at an airport parking location.

Aircraft may be parked at parking locations with or without passenger loading bridges. The terms "loading bridge" and "passenger loading bridge" refer to structures attached to an airport terminal used to transfer passengers between the terminal and aircraft and are contemplated to include known types of loading bridges, which may be fixed, may be extendible and retractable, or may have other mechanisms for providing a typically enclosed connection between a terminal and an aircraft for passenger movement.

"Electric taxi drive systems," "drive systems," and "electric taxi systems" refer to pilot-controllable landing gear wheel-mounted drive systems used to drive aircraft independently of and without reliance on operation of aircraft main engines and tugs or external tow vehicles. Electric taxi drive systems may include landing gear wheel-mounted electric drive motors, gear or roller traction drive systems, clutches, and other components activatable to power landing gear wheels and drive the aircraft during ground travel in response to pilot control. An example of one electric taxi drive system developed by Applicant to drive an aircraft during ground travel without reliance on operation of the aircraft's main engines or attachment to tugs is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the aircraft maneuvering and alignment method of the present invention and are contemplated to be included within the terms "electric taxi drive systems" and "drive systems." An electric taxi drive system is advantageously mounted completely within a volume defined by walls of a landing gear wheel in one or more nose or main landing gear wheels. In a preferred embodiment, electric taxi drive systems are mounted completely within defined wheel wall volumes in both nose landing gear wheels and are controlled by a pilot or flight crew from the aircraft cockpit with controls designed to operate the electric taxi drive system, power the nose landing gear wheels, and drive the aircraft during ground travel without reliance on the aircraft's main engines and external assistance from tugs.

Referring to the drawings, which are not drawn to scale, FIG. 1 shows a diagrammatic plan view of an airport ramp area parking location at an airport terminal with an aircraft approaching the parking location. Only a single parking location for a single aircraft is shown; multiple parking locations are typically provided for multiple aircraft. Other aircraft, ground service vehicles, ground service equipment, and ground personnel likely to be present in the ramp area have been omitted for clarity. An arriving aircraft 10, which is equipped with nose landing gear wheel-mounted electric taxi drive systems and is driven during ground travel by the electric taxi drive systems without reliance on operation of the aircraft engines or tow vehicles, is shown being driven within the ramp area toward an airport terminal building 12 where the arriving aircraft will park at a designated parking location. A passenger loading bridge 14 that may be used to transfer passengers on the aircraft 10 to the terminal 12 is shown retracted toward the terminal and away from the arriving aircraft. Not all passenger loading bridges are extendible and retractable; some are fixed, and aircraft may be required to maneuver into position to connect with loading bridges, as discussed below.

The travel path of the aircraft 10 to its assigned arrival parking location, as discussed above, corresponds to the path defined by a taxi or lead-in line 16, and ends at a parking stop location 18. The location of the taxi line 16 and the location of the stop 18 may be determined, for example, by the size of the ramp area, the number of gates, whether loading bridges or stairs are used for passenger transfer, the kinds and lengths of loading bridges, and the types of aircraft parking in the terminal parking location. As noted above, the taxi lines and the parking stop locations may be represented by actual lines painted on the ground surface and by other materials, such as reflective strips applied to the ground surface. At an increasing number of airports where visual guidance docking systems are in use, there may or may not be actual lines on the ground surface for the aircraft to follow. Visual signals on terminal or other displays may communicate a taxi line path and/or a stop location to the aircraft cockpit crew. The method described herein is contemplated to encompass both arrangements.

The arriving aircraft 10 shown in FIG. 1 is following the path of the taxi line 16, and the aircraft's nose landing gear wheels 20 are aligned with the taxi line 16 as the aircraft is driven by the electric taxi drive systems, which may be mounted in the nose landing gear wheels 20. When the nose landing gear wheels arrive at the parking stop location 18 at the terminal end of the taxi line 16, the aircraft is correctly positioned in its parking location and may stop. A fixed or extendible loading bridge 14 may be connected with an aircraft door, and passengers may disembark from the aircraft and enter the terminal 12 through the loading bridge 14.

Ground personnel (not shown) may guide the pilot driving the aircraft along the taxi line 16 to the stop location 18 and communicate to the pilot whether the aircraft nose landing gear wheels 20 are aligned with the taxi line 16 and that the nose landing gear wheels have reached the stop location. Ground personnel may also guide the pilot in maneuvering the aircraft as required to ensure and correct alignment of the aircraft with the taxi line path and the parking stop location. The aircraft may also be provided with a camera and sensor system, discussed in detail in connection with FIG. 4, that provides a view of the aircraft nose landing gear wheels as they move along the taxi line 16 toward the stop location 18. This view is communicated to the cockpit crew, who will be able to see, in real time, the progress of the nose landing gear wheels along the taxi line and will know when they reach the stop location 18. At the airport terminals equipped with visual guidance docking systems, movement of the electric taxi drive system-driven aircraft to the stop location may be guided by that system. A combination of ground personnel, camera, and/or visual guidance docking system guidance may also be employed to guide an aircraft's electric taxi system-driven maneuvers to align with the taxi line travel path and with the parking stop location.

Figure 2A:
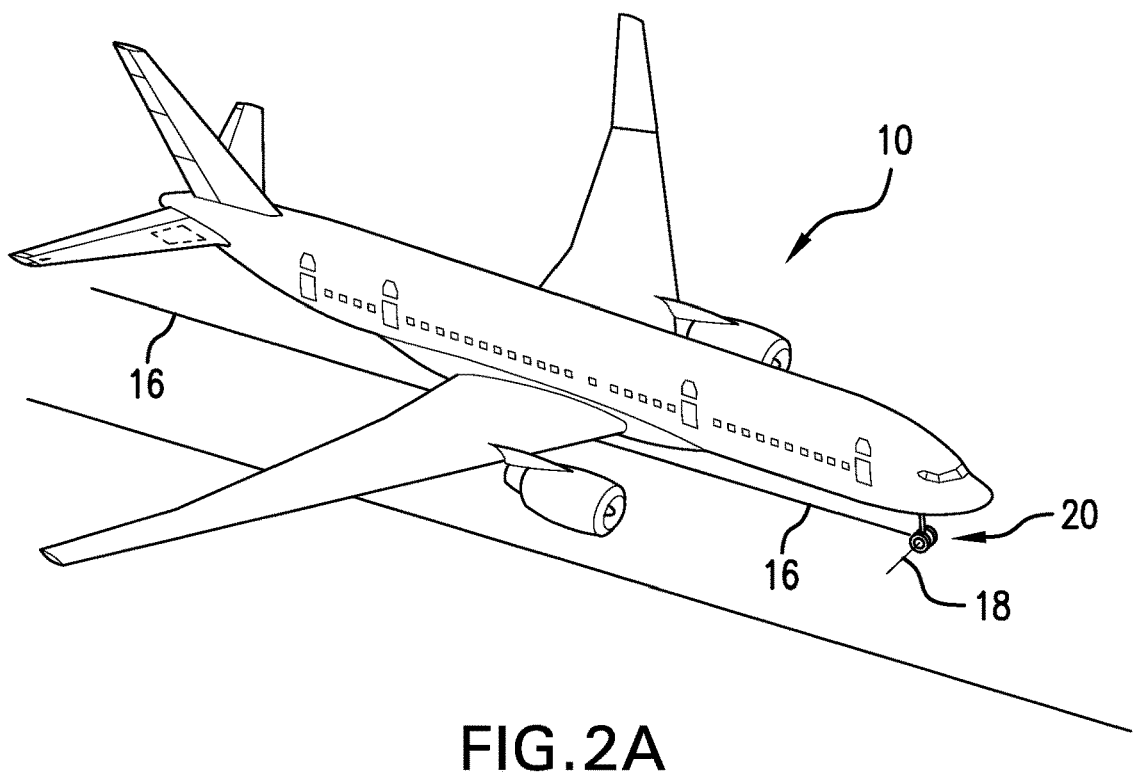
FIG. 2A is a diagrammatic plan view of a portion of the airport ramp parking area of FIG. 1 showing the equipped aircraft parked with nose landing gear wheels aligned with the parking location stop.
Figure 2B:
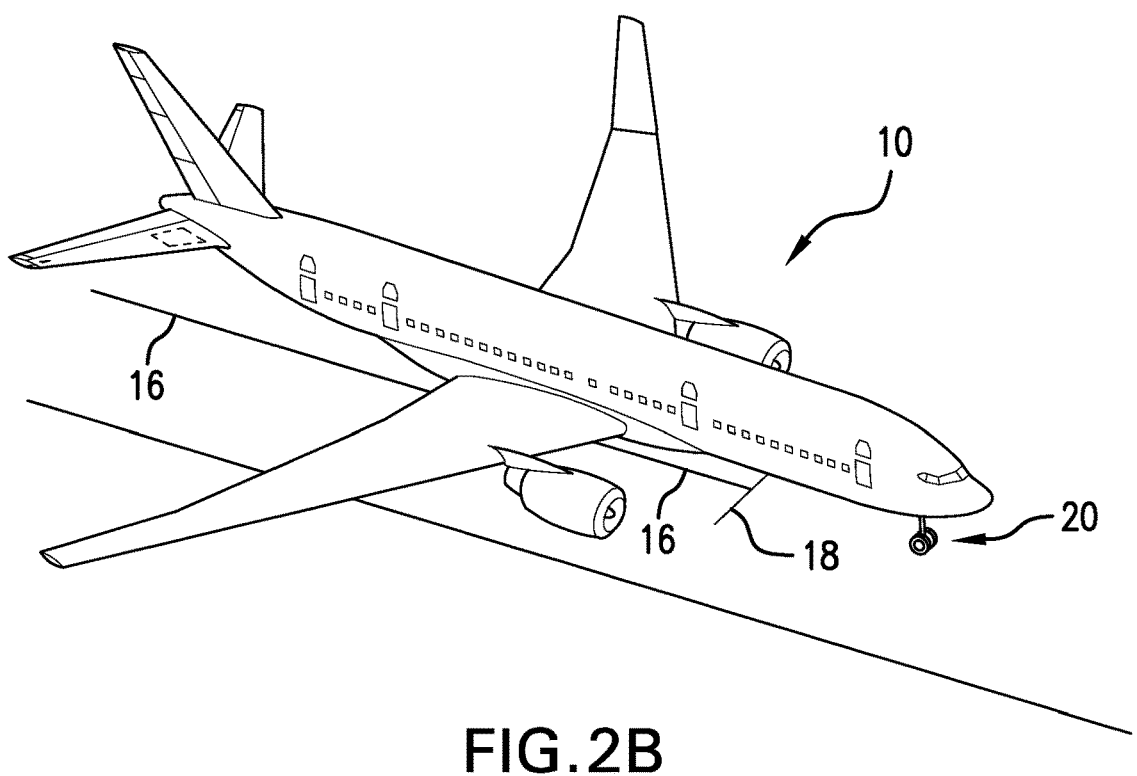
FIG. 2B is a diagrammatic plan view of a portion of the airport ramp parking area of FIG. 1 showing the equipped aircraft stopped with nose landing gear wheels located beyond or past the parking location stop.

FIGS. 2A and 2B show views of a portion of the airport ramp parking area of FIG. 1. FIG. 2A shows the aircraft 10 parked accurately with nose landing gear wheels 20 stopped at and aligned with the location of the parking stop 18. FIG. 2B shows the aircraft 10 with nose landing gear wheels 20 stopped a distance beyond the location of the parking stop 18. The nose landing gear wheels 20 of the aircraft 10 in FIG. 2A are clearly positioned on and aligned with the location of the stop 18. In FIG. 2B, the aircraft 10 has been driven beyond the stop 18, and the nose landing gear wheels are located significantly past the location of the stop 18 so that the aircraft 10 is not parked accurately in its designated parking location. The aircraft cannot remain in this inaccurate parking location and complete arrival operations, including connecting a loading bridge (14 in FIG. 1) or stairs (not shown) and transferring passengers from the aircraft to the terminal. Until Applicant's discovery that a stopped aircraft may be precisely maneuvered in reverse with electric taxi drive systems from a position past the stop 18 (FIG. 2B) to a position with the nose landing gear wheels located at and aligned with the stop 18 (FIG. 2A), inaccurately positioned aircraft were moved in reverse by attachment to a tow vehicle or tug. The attached tug then pushed back the aircraft the distance from where it had inaccurately stopped to the parking stop 18 so that the nose landing gear wheels were aligned with the stop 18. The disadvantages of using a tug for this maneuver are described above. Pilot activation of the aircraft's electric taxi drive systems to drive the aircraft in reverse for what is typically a short distance to move the nose landing gear wheels 20 to align with the parking stop 18 can not only be done as soon as it has been discovered that the aircraft has overshot the stop location, but this maneuver can be accomplished precisely and safely without waiting for a tug.

If, instead of overshooting the stop location 18, the aircraft 10 stops short of the stop, for example at the location shown in FIG. 1, the pilot can activate the electric taxi drive systems and move the aircraft forward the distance required for the nose landing gear wheels to reach and align with the stop 18. In the past, moving an aircraft forward in this situation may have required attachment to a tug to pull the aircraft forward or restarting an engine and exerting enough thrust to move the aircraft forward what would likely be a relatively short distance.

Maneuvering an aircraft into a parking stop location in either a forward or a reverse direction with electric taxi drive systems is a far quicker, simpler, and safer operation than using engines or tugs to move the aircraft. Additionally, these maneuvers can be performed with greater precision to ensure that aircraft are accurately parked and in alignment with the designated stop location. When a camera and sensor system is provided on the aircraft, a view of the taxi line 16 and parking stop 18 may be provided to the cockpit to assist the cockpit crew and pilot in maneuvering the aircraft in both forward and reverse directions. The pilot may more precisely maneuver the aircraft 10 forward as required to align the nose landing gear wheels 20 with the stop location 18 when the nose landing gear wheels have stopped short of the location of the stop 18 and are in the position shown in FIG. 1, or maneuver the aircraft in reverse to align the nose landing gear wheels 20 with the stop 18 when they have overshot the stop location and stopped beyond the parking stop 18 and are in the position shown in FIG. 2B.

Figure 3:
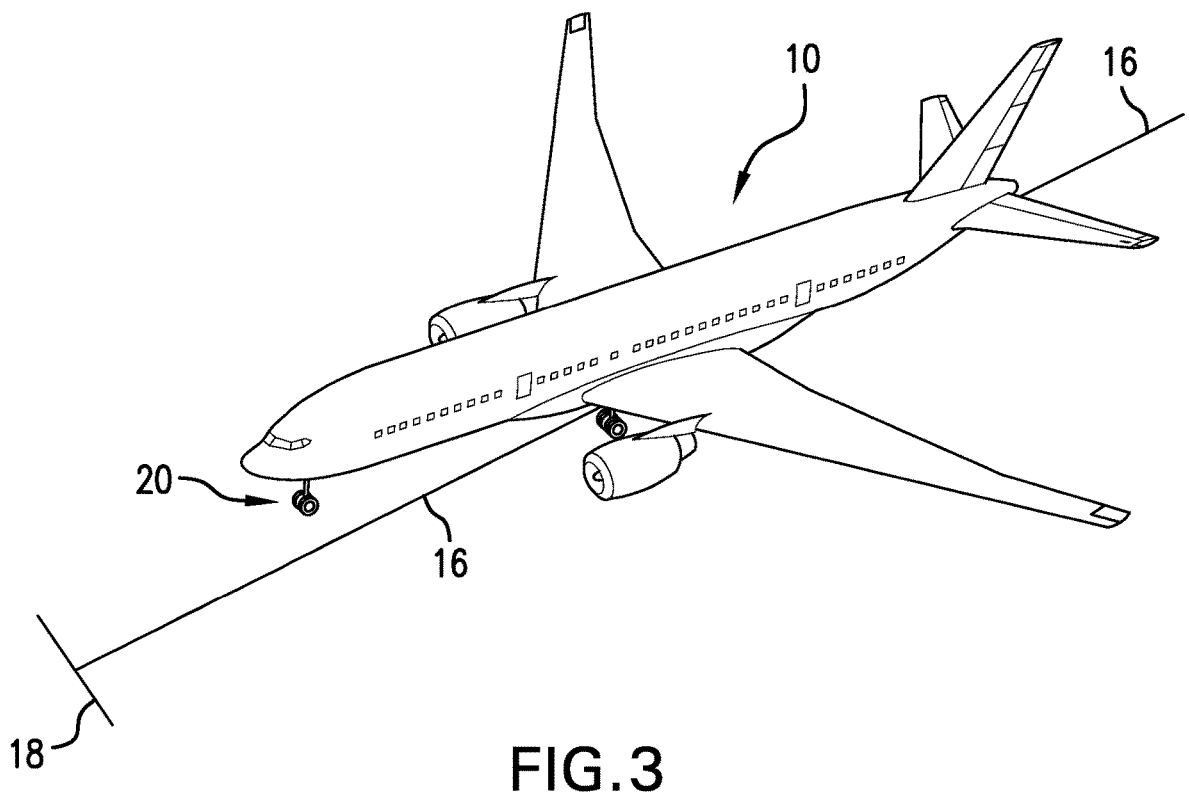
FIG. 3 is a diagrammatic plan view of a portion of the airport ramp parking area of FIG. 1 showing a taxi line or lead-in line and the parking location stop with the equipped aircraft nose landing gear wheels directed to the right of the taxi line and the equipped aircraft ground travel path not aligned with the taxi line.

FIG. 3 shows a portion of the airport ramp parking area of FIG. 1 and illustrates that the nose landing gear wheels 20 of the aircraft 10 have veered to the right of the taxi line 16, and the aircraft's travel path has deviated from the taxi line path and is no longer aligned with the taxi line path. In this situation, ground personnel may guide the aircraft's maneuvers to realign with the taxi line path, which may include forward and/or reverse movements of the aircraft to change the lateral position of the aircraft relative to the taxi line path 16. When available, a camera and sensor system may provide a view of the taxi line to the cockpit, and the cockpit crew will be able to see how far the nose landing gear wheels 20 have traveled away from the taxi line 16. Since this may be likely to happen as the aircraft 10 is driven along the taxi line 16 to the location of the stop 18 with the electric taxi drive systems, the aircraft will already be in motion, and in some cases the nose wheel steering may be used to change the aircraft direction of travel and easily and quickly align the aircraft's travel path with the path of the taxi line 16. In other cases, depending on the extent of the deviation, forward and/or reverse maneuvers with the electric taxi drive system may be required to align the aircraft. Similarly, although not shown, if the aircraft has veered to the left of the taxi line 16 and the nose landing gear wheels 20 are left of the taxi line and this information is provided to the cockpit by ground personnel or a camera and sensor system, the aircraft may be steered with the nose wheel steering to change its direction of travel to align with the taxi line 16. When the deviation to the left requires it, the aircraft 10 may be maneuvered in forward and/or reverse directions with the electric taxi drive systems to align the nose landing gear wheels 20 with the taxi line 16. In the past, if the travel path of the aircraft of the aircraft could not be corrected to align with the taxi line path by steering the aircraft's nose landing gear wheels, attachment to a tug might be required to move the aircraft back into alignment with the taxi line path.

The maneuvers just described may be particularly useful when an aircraft has reached the parking stop location and is not accurately positioned to connect to a passenger loading bridge. As indicated, some passenger loading bridges are fixed and have fixed lengths; extendible passenger loading bridges may be limited in how far they may extend. It might be necessary to maneuver an aircraft when it reaches the parking stop location to move a small distance in a reverse or forward direction, as well as a small distance laterally to the left since loading bridges are typically connected to an aircraft's left doors, to precisely dock the aircraft with the loading bridge.

Figure 4:
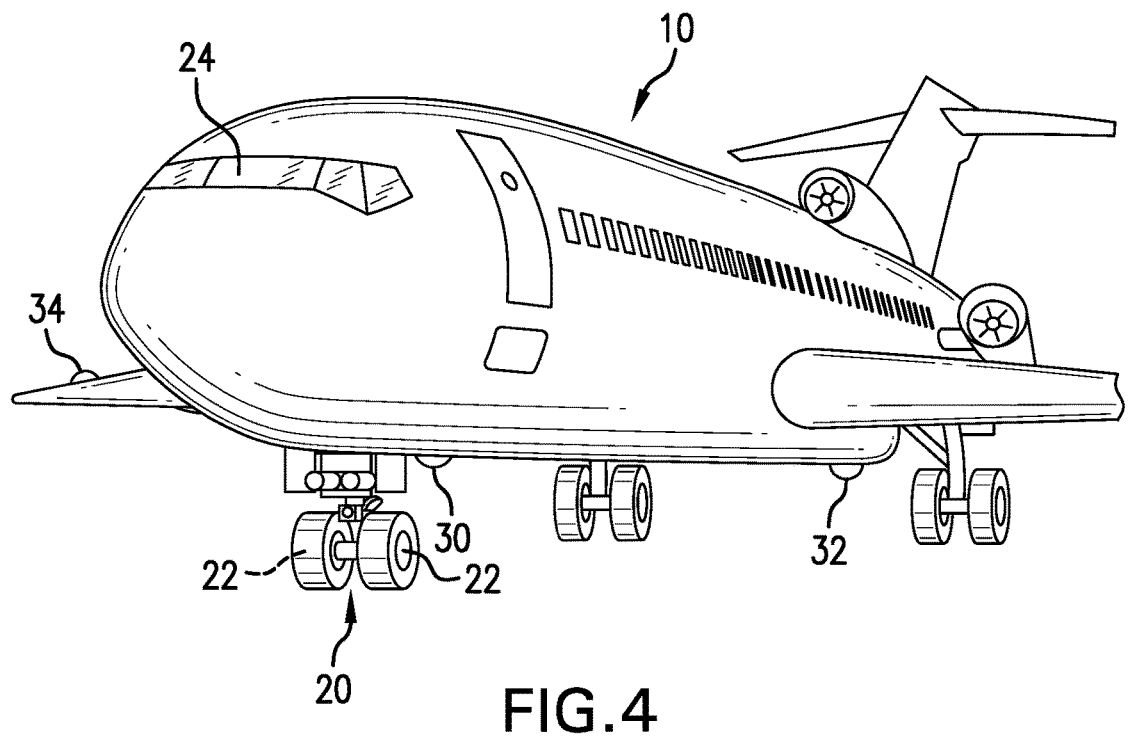
FIG. 4 is a perspective view of an aircraft equipped with landing gear wheel-mounted electric taxi drive systems and a camera and sensor system for precisely and safely maneuvering the equipped aircraft through an airport ramp along a ground travel path in alignment with a taxi line and into an airport parking location to stop with the nose landing gear wheels positioned in alignment with a stop location in accordance with the present invention.

FIG. 4 shows a perspective view of the aircraft 10 equipped with both nose landing gear wheel-mounted electric taxi drive systems and a camera and sensor system for precisely maneuvering the aircraft to align with a taxi line and with the location of a parking stop, as described above in connection with FIGS. 2A, 2B, and 3. Each of the nose landing gear wheels 20 of the aircraft 10 may be equipped with an electric taxi drive system 22 mounted completely within a volume or space defined by the wheel wall sections of each nose landing gear wheel. As noted above, electric taxi drive systems may also be mounted completely within main landing gear wheels. The electric taxi drive systems are controllable by a pilot in the cockpit 24 of the aircraft 10 to drive and maneuver the aircraft in forward and reverse directions during ground travel, including ramp ground travel, without reliance on operating aircraft engines and attachment to tugs. Operation of the nose landing gear wheel-mounted electric taxi drive systems in conjunction with the nose landing gear wheel steering enables the pilot to perform precise maneuvers requiring changes in direction at angles not possible when aircraft are moved on the ground by engines and tugs. These maneuvers include those described in connection with FIGS. 2A, 2B, and 3, as well as lateral and other maneuvers that might be needed to accurately position aircraft to connect with passenger loading bridges and, at some airports, service connections. The described maneuvers may be conducted quickly, precisely, and safely during electric taxi drive system-powered ground travel within the airport ramp area and at locations of airport parking stops to ensure that the aircraft is traveling accurately along the path defined by the taxi line, has arrived at a required stop location, and may be connected to a passenger loading bridge.

The foregoing aircraft maneuvering capabilities are enhanced by providing a camera and sensor system with camera and sensor elements that may be mounted in positions on the exterior of the aircraft that have been determined to capture a view of selected spaces in the aircraft's external ramp environment as the aircraft is driven with the nose landing gear wheel-mounted electric taxi drive systems. For example, real time views of the aircraft nose landing gear wheels 20 and the ground spaces around the nose landing gear wheels 20 are particularly important to help the pilot and cockpit crew determine the location of the nose landing gear wheels 20 in relation to the locations of the taxi line 16 and the stop 18 and to accurately maneuver the aircraft to align with the taxi line and with the stop. Real time views of the ground surface below the aircraft fuselage and near the tail end of the aircraft may help the pilot determine the location of the taxi line as the aircraft is driven in reverse during maneuvers to align the aircraft with the taxi line or the stop. Real time views of the aircraft nose area may help the pilot maneuver the aircraft more accurately to align its travel path with the taxi line and to avoid collisions with ground service vehicles and equipment as the pilot maneuvers an aircraft that has veered off the taxi line path back into alignment. Cameras (represented schematically) with or without sensors may be positioned in various locations on the exterior of the aircraft 10. Preferred locations where cameras may be positioned to assist with the aircraft maneuvers described herein are shown in FIG. 4. These locations may obtain the aircraft position and location information needed to precisely and accurately maneuver the aircraft so that the nose landing gear wheels 20 may be realigned with the taxi line 16 or aligned with the stop location 18 as described herein. Depending on the type of aircraft, alternative and/or additional camera locations may also be suitable for obtaining this information. For example, a camera 30 maybe located on the aircraft fuselage ground-facing surface near the nose landing gear wheels 20, such as to the rear of the nose landing gear wheels as shown. Another camera 32 may be positioned on the aircraft fuselage ground-facing surface closer to the aircraft tail, and additional cameras 34, only one of which is visible, may be located on each of the aircraft wings. Other locations for cameras and sensors, if used, may also be suitable and are contemplated to be within the scope of the present invention.

Views of the nose landing gear wheels may be transmitted to a processor (not shown) or directly to the cockpit. Advantageously, the cameras will provide real time views to the cockpit of the nose landing gear wheels 20, the taxi line 16, and the parking stop 18 while the aircraft 10 is driven with the electric taxi drive systems 22 through the ramp area and into a parking location. This will enable the pilot to maneuver the aircraft with the electric taxi systems as required to remain aligned with the taxi line 16 and to stop with the aircraft nose landing gear wheels precisely at the parking stop 18. If, as described above, the aircraft must be maneuvered in reverse or forward to the parking stop location, or to re-align the aircraft's travel path, the cameras described should facilitate operation of the electric taxi drive system to conduct these aircraft maneuvers.

While the present invention has been described with respect to preferred embodiments, this is not intended to be limiting, and other arrangements and structures that perform the required functions are contemplated to be within the scope of the present invention.

INDUSTRIAL APPLICABILITY

The method of the present invention will have its primary applicability where it is desired to easily and precisely maneuver and reposition aircraft equipped and driven with landing gear wheel-mounted electric taxi drive systems during ramp ground travel to align with a lead-in or taxi line and with a parking stop at an airport terminal parking location so that when the equipped aircraft have deviated from lead-in or taxi line travel paths or have undershot or overshot parking stops, they may be aligned with the lead-in or taxi line and the parking stop without relying on tugs or re-starting engines.

The invention claimed is:

1. A method for precisely maneuvering aircraft equipped with nose landing gear wheel steering systems, camera and sensor systems, and pilot-controllable nose landing gear wheel-mounted electric taxi drive systems to parking locations within an airport ramp area with a plurality of aircraft taxi paths leading to parking stop locations at each parking location, comprising:

a. defining taxi lines on a surface of the ramp area corresponding to the plurality of aircraft taxi paths leading to the parking stop locations at the airport ramp area parking locations;

b. providing aircraft equipped with the pilot-controllable electric taxi drive systems mounted completely within a volume defined by wheel wall sections of each nose landing gear wheel operable to move the equipped aircraft during ground travel within the airport ramp area and with the camera and sensor systems mounted in exterior positions on an exterior of the equipped aircraft to capture real time views of ramp ground surfaces around the nose landing gear wheels and tail ends of the equipped aircraft as the equipped aircraft are maneuvered along the defined taxi lines for transmission to a cockpit in the equipped aircraft and to a processor, and providing an assigned airport ramp area parking location with a defined taxi line leading to a parking stop location at an assigned ramp area parking location for the equipped aircraft;

c. driving the equipped aircraft to the defined taxi line for the assigned parking location within the airport ramp area, simultaneously operating the camera and sensor system, capturing the real time views of the ramp ground surfaces around the nose landing gear wheels and the tail ends as the pilot controls the electric taxi drive system and maneuvers the equipped aircraft along the defined taxi line leading to the parking stop location, and transmitting the captured real time views to the cockpit or the processor as the pilot maneuvers the equipped aircraft with the electric taxi drive systems and the nose landing gear wheels in precise alignment with the defined taxi line toward the parking stop location at the equipped aircraft's assigned ramp area parking location;

d. using the transmitted captured real time views of the ramp ground surfaces around the nose landing gear wheels and the tail ends and controlling the electric taxi drive systems by the pilot to maneuver the equipped aircraft and maintain the nose landing gear wheels precisely aligned with the defined taxi line as the equipped aircraft is driven with the electric taxi drive systems toward the parking stop location; and e. using the transmitted captured real time views of the ramp ground spaces around the nose landing gear wheels and transmitted captured real time views of the parking stop location and controlling the equipped aircraft electric taxi drive systems by the pilot to stop the equipped aircraft with the nose landing gear wheels precisely aligned with the parking stop location at the equipped aircraft's assigned parking location.

2. The method of claim 1, further comprising when the transmitted captured real time views show that the nose landing gear wheels are not aligned with and have deviated from the defined taxi line, operating the nose landing gear wheel steering system and concurrently maneuvering the equipped aircraft with the electric taxi drive systems in forward, reverse, and lateral directions as required to re-align the nose landing gear wheels with the defined taxi line, and continuing to drive the equipped aircraft with the electric taxi drive systems and the re-aligned nose landing gear wheels along the defined taxi line.

3. The method of claim 1, further comprising when the transmitted captured real time views show that nose landing gear wheels of the equipped aircraft have moved out of alignment with the defined taxi line and are driving the aircraft to the right of the defined taxi line, maneuvering the equipped aircraft laterally to the left with the electric taxi drive systems, aligning the nose landing gear wheels with the defined taxi line, and continuing to drive the equipped aircraft along the defined taxi line to the parking stop location with the electric taxi drive systems.

4. The method of claim 2, further comprising when the transmitted captured real time views show that nose landing gear wheels of the equipped aircraft have moved out of alignment with the defined taxi line and are driving the aircraft to the left of the defined taxi line, maneuvering the equipped aircraft laterally to the right with the electric taxi drive systems, aligning the nose landing gear wheels with the defined taxi line, and continuing to drive the equipped aircraft along the defined taxi line to the parking stop location with the electric taxi drive systems.

5. The method of claim 2, further comprising when the transmitted captured real time views show that the equipped aircraft has stopped and the nose landing gear wheels are not precisely aligned with the parking stop location, maneuvering the stopped equipped aircraft with the electric taxi drive systems by the pilot in a forward direction or in a reverse direction as required to accurately position the equipped aircraft's nose landing gear wheels in precise alignment with the parking stop location.

6. The method of claim 5, further comprising when the transmitted captured real time views show the stopped equipped aircraft's nose landing gear wheels are positioned a distance before the parking stop location, maneuvering the stopped equipped aircraft with the electric taxi drive systems in a forward direction for the distance along the defined taxi line and precisely aligning the nose landing gear wheels with the parking stop location.

7. The method of claim 5, further comprising when the transmitted captured real time views show the stopped aircraft's nose landing gear wheels are positioned a distance past the parking stop location, maneuvering the stopped equipped aircraft with the electric taxi drive systems in a reverse direction for the distance along the defined taxi line and precisely aligning the nose landing gear wheels with the parking stop location.

8. The method of claim 5, further comprising mounting cameras in the camera and sensor system in selected exterior positions on the equipped aircraft fuselage ground-facing surface and capturing the real time views of the ramp ground surfaces around the nose landing gear wheels, the tail ends, the defined taxi line, and the parking stop location not otherwise visible to a pilot in the equipped aircraft cockpit from the cameras in the selected exterior positions.

9. The method of claim 8, further comprising providing a visual guidance docking system at the plurality of parking locations and visual signals representing the equipped aircraft defined taxi line and parking stop location for each parking location, communicating locations of equipped aircraft defined taxi lines and parking location stops with the visual signals to pilots in cockpits of the equipped aircraft and guiding alignment of the equipped aircraft nose landing gear wheels with the defined taxi lines and parking location stops, and maneuvering the equipped aircraft with the electric taxi drive systems in response to the visual signals as required to maintain alignment of the nose landing gear wheels with the defined taxi lines and parking location stops.

10. The method of claim 8, further comprising providing passenger loading bridges at each of the assigned aircraft parking locations adjacent to the parking stop locations, using the transmitted captured real time views of the aircraft nose landing gear wheels and tail end, the defined taxi line, and the parking stop location, and maneuvering the equipped aircraft by the pilot with the electric taxi drive systems into a parked position at the assigned aircraft parking locations that enables accurate alignment and connection with the passenger loading bridges.

11. The method of claim 10, further comprising maneuvering an equipped aircraft with the electric taxi drive systems in forward, reverse, or lateral directions as required at an assigned parking location and positioning the equipped aircraft to align accurately with a passenger loading bridge at the aircraft's assigned ramp area parking location.

* * * * *